United States Patent
Wagoner

(10) Patent No.: US 9,431,846 B2
(45) Date of Patent: Aug. 30, 2016

(54) SYSTEMS AND METHODS FOR CONTROLLING BATTERY CHARGING

(71) Applicant: General Electric Company, Schenedtady, NY (US)

(72) Inventor: Robert Gregory Wagoner, Salem, VA (US)

(73) Assignee: General Electric Company, Schenectady, NY (US)

( * ) Notice: Subject to any disclaimer, the term of this patent is extended or adjusted under 35 U.S.C. 154(b) by 850 days.

(21) Appl. No.: 13/712,431

(22) Filed: Dec. 12, 2012

(65) Prior Publication Data

US 2014/0159643 A1     Jun. 12, 2014

(51) Int. Cl.
*H02J 7/00*     (2006.01)
*H02J 3/32*     (2006.01)

(52) U.S. Cl.
CPC ............ *H02J 7/0077* (2013.01); *H02J 7/0021* (2013.01); *H02J 3/32* (2013.01)

(58) Field of Classification Search
USPC ................................................ 320/107, 130
See application file for complete search history.

(56) References Cited

U.S. PATENT DOCUMENTS

| | | | |
|---|---|---|---|
| 6,876,175 B2 | 4/2005 | Schoch | |
| 7,095,211 B2* | 8/2006 | Denning | G01R 31/3648 320/132 |
| 7,855,906 B2* | 12/2010 | Klodowski | H02M 7/48 363/97 |
| 8,099,180 B2 | 1/2012 | Schoch | |
| 8,259,479 B2* | 9/2012 | Wagoner | H02J 3/38 363/131 |
| 2001/0022518 A1* | 9/2001 | Asakura | G01R 31/3679 324/426 |
| 2006/0273763 A1* | 12/2006 | Arai | G01R 31/3624 320/133 |
| 2009/0027932 A1* | 1/2009 | Haines | H02J 9/062 363/95 |

OTHER PUBLICATIONS

"Battery & Fuel Cell Prognostic/Diagnostic System (BattPDS)" Global Technology Connection, Inc. <www.globaltechinc.com>. Atlanta, GA. 2 pages.

* cited by examiner

*Primary Examiner* — Yalkew Fantu
(74) *Attorney, Agent, or Firm* — Sutherland Asbill & Brennan LLP

(57) ABSTRACT

Systems and methods for controlling battery charging are disclosed. According to one embodiment of the disclosure, a method can include receiving battery state information; determining, based on the battery state information, whether to adjust battery models; and, if so, adjusting the battery models.

18 Claims, 5 Drawing Sheets

SYSTEMS AND METHODS FOR CONTROLLING BATTERY CHARGING

FIELD OF THE DISCLOSURE

Embodiments of the disclosure relate generally to electric power storage, and more particularly, to systems and methods for controlling battery charging.

BACKGROUND

Conventional battery charge curves and discharge curves are dependent upon factors such as the battery voltage, current, and temperature, as well as other factors based on the characteristics of the particular batteries in a given system. Various charging methodologies can be used for charging and discharging the batteries. Certain basic charging and discharging methodologies are based on a fixed voltage or current regulation scheme without any battery charge monitoring. More sophisticated charging and discharging methodologies may monitor battery current to estimate the state of charge, or may monitor battery voltage, current, and temperature, but each may still employ a fixed level of charging current based on those three variables. These conventional methodologies may result in undercharging or overcharging the batteries, which can reduce the life and supply of the batteries.

BRIEF SUMMARY

Some or all of the above needs and/or problems may be addressed by certain embodiments of the disclosure. Certain embodiments may include systems and methods for controlling battery charging. According to one embodiment of the disclosure, there is disclosed a system. The system can include a memory that stores computer-executable instructions. The system can also include a processor configured to access the memory. The processor can be configured to execute the computer-executable instructions to perform certain operations. The operations can include receiving, from a sensor in communication with a battery, state information related to the battery. Further, the operations can include measuring, based at least in part on the state information related to the battery, at least one of a charge curve associated with the battery or a discharge associated with the battery. The operations can also include creating a model of the battery based at least in part on at least one of the charge curve associated with the battery or the discharge curve associated with the battery. Moreover, the operations can include determining whether to adjust the model of the battery based at least in part on the state information related to the battery. The operations can also include adjusting the model of the battery based at least in part on the state information related to the battery in response to a determination that the model of the battery is to be adjusted.

According to another embodiment of the disclosure, there is disclosed a method. The method can include receiving, from a sensor in communication with a battery, state information related to the battery. The method can also include measuring, based at least in part on the state information related to the battery, at least one of a charge curve associated with the battery or a discharge curve associated with the battery. Furthermore, the method can include creating a model of the battery based at least in part on at least one of the charge curve associated with the battery or the discharge curve associated with the battery. The method can also include determining whether to adjust the model of the battery based at least in part on the state information related to the battery. Moreover, the method can include adjusting the model of the battery based at least in part on the state information related to the battery in response to a determination that the model of the battery is to be adjusted.

Further, according to another embodiment of the disclosure, there is disclosed a system. The system can include a battery, a charger in communication with the battery, a sensor in communication with the battery, and a memory. The system can also include a processor configured to access the memory. The processor can be configured to execute the computer-executable instructions to perform certain operations. The operations can include receiving state information related to the battery from the sensor in communication with the battery. Further, the operations can include determining whether to adjust a model of the battery based at least in part on the state information related to the battery. The operations can also include adjusting the model of the battery based at least in part on the state information related to the battery in response to a determination that the model of the battery is to be adjusted.

Other embodiments, systems, methods, apparatus aspects, and features of the disclosure will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the disclosure are directed to, among other things, controlling battery charging. As an overview, certain battery charging systems can include a battery, a battery charger and a utility grid. In some embodiments, the battery charger can include a battery monitor, a battery charging component, and a controller. In one embodiment, the charging of the battery can be controlled by certain operations. The operations can include receiving state information related to the battery from the battery monitor. Further, the operations can include measuring a battery charge curve and/or a battery discharge curve associated with the battery based at least in part on the state information related to the battery. The operations can also include creating a model of the battery based at least in part on the battery charge curve and/or the battery discharge curve associated with the battery. Moreover, the operations can include determining whether to adjust the model of the battery based at least in part on the state information related to the battery. The operations can yet also include adjusting the model of the battery in response to a determination that the model associated with the battery is to be adjusted.

The technical effects of certain embodiments of the disclosure may include facilitating the operation of battery energy storage systems, such as facilitating higher battery reliability and higher battery output power capability. Moreover, the technical effects of certain embodiments of the disclosure may include fine tuning the charging operations for certain batteries, and slowly adjusting the performance of the certain batteries to continue to be optimal as the certain batteries change with age and maintenance cycles.

Figures 1, 2:
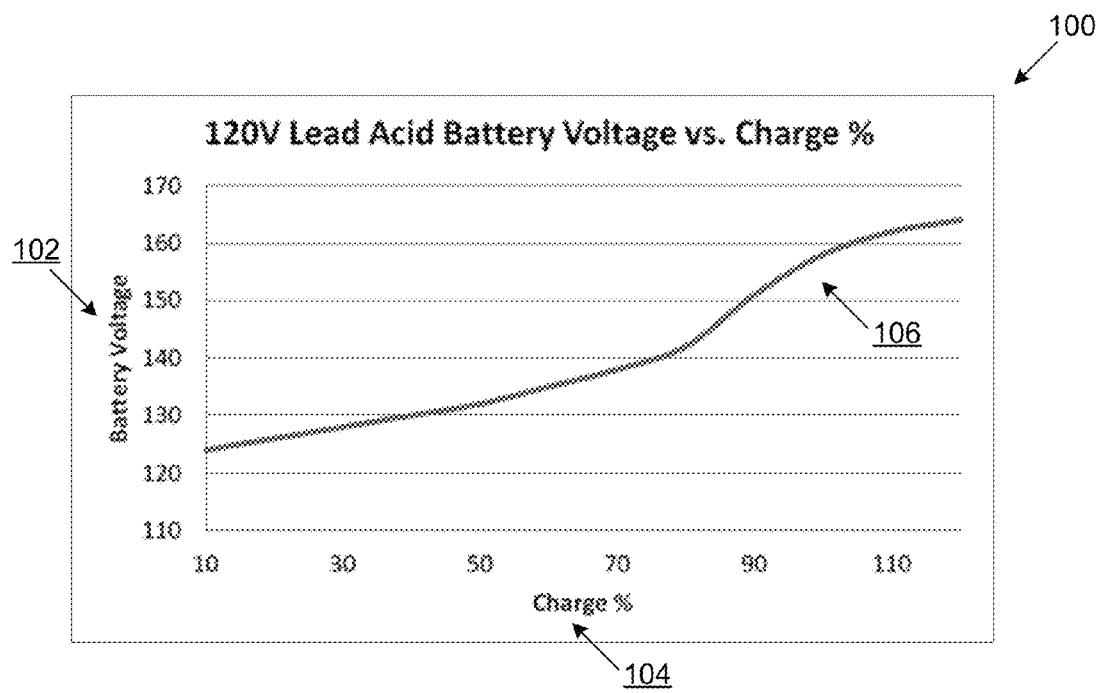
FIG. 1 illustrates an example charge curve according to an embodiment of the disclosure.
FIG. 2 illustrates an example discharge curve according to an embodiment of the disclosure.

FIG. 1 depicts a graphical view of the charging of a series of lead acid batteries with a nominal voltage rating of 120 VDC, as an example for illustration. The graphical view 100 includes a vertical axis 102, a horizontal axis 104, and a charge curve 106. The vertical axis 102 represents the voltage of the batteries. The horizontal axis 104 represents the charge percent of the batteries. The charge curve 106 represents the relationship between the voltage of the batteries and the charge percent of the batteries. In certain embodiments, a charge curve, such as 106, can be measured based at least in part on state information related to a battery. In some embodiments, a model of a battery can be created based at least in part on a charge curve, such as 106.

FIG. 2 depicts a graphical view of the discharging of a series of lead acid batteries with a nominal voltage rating of 120 VDC, as an example for illustration. The graphical view 200 includes a vertical axis 202, a horizontal axis 204, and four discharge curves. The discharge curves are associated with a first current 206, a second current 208, a third current 210, and a fourth current 212, respectively. The vertical axis 202 represents the voltage of the batteries. The horizontal axis 204 represents the time discharging the respective current in minutes. The discharge curves 206, 208, 210 and 212 represent the relationship between the voltage of the batteries and the time discharging the respective currents. For instance, the discharge curve associated with the first current 206 represents the relationship between the voltage of the batteries and the time discharging the first current. In certain embodiments, a discharge curve, such as 206, 208, 210, and 212, can be measured based at least in part on state information related to a battery. In some embodiments, a model of a battery can be created based at least in part on a discharge curve, such as 206, 208, 210, and 212.

Figure 3:
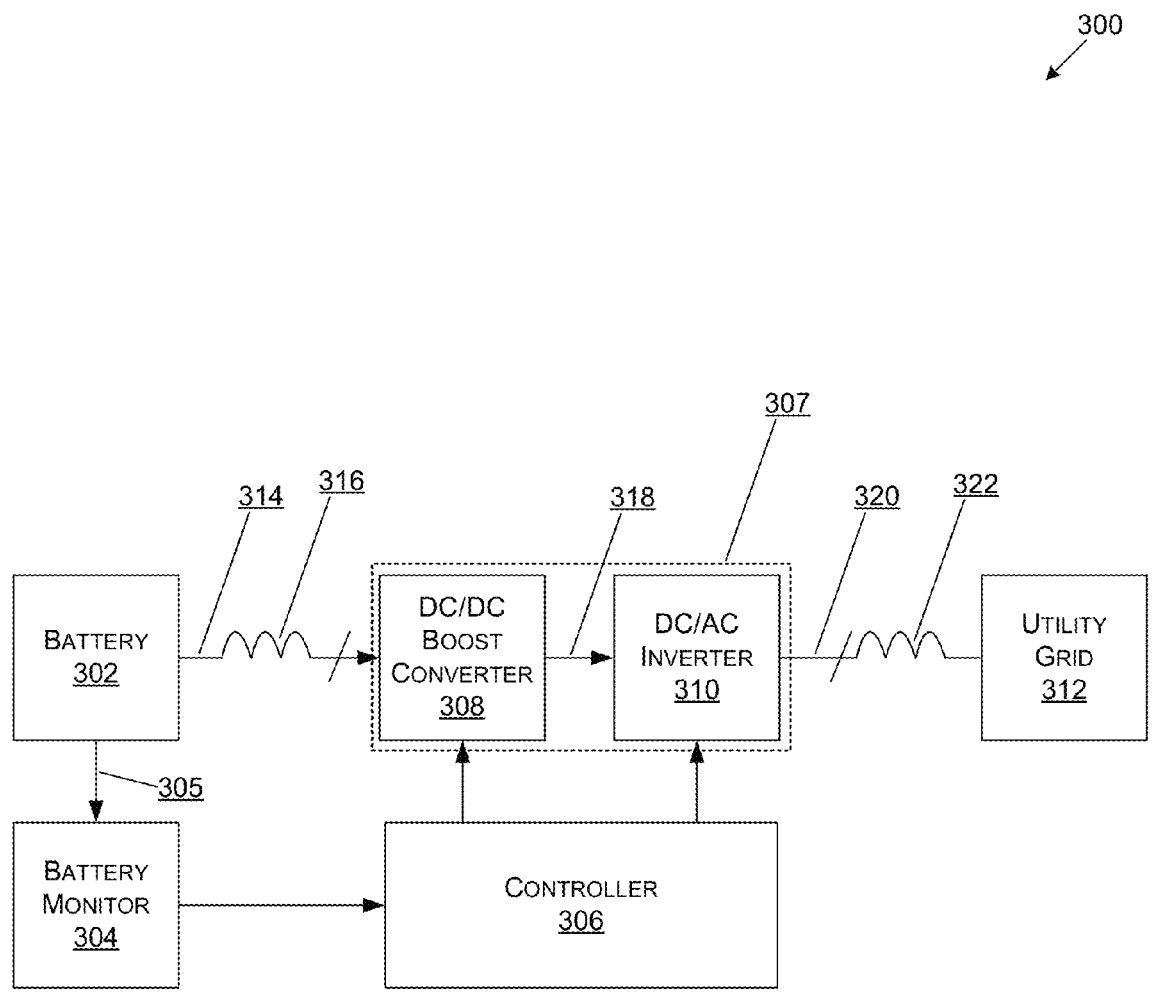
FIG. 3 illustrates an example system according to an embodiment of the disclosure.

FIG. 3 depicts certain illustrative components for a system 300 in which techniques for controlling battery charging may be implemented. As shown in FIG. 3, an example system 300 can include at least one battery 302, at least one charging component 307, and at least one utility grid 312. The system 300 may facilitate the transmission of at least one phase of electric power from the at least one battery 302 to the at least one utility grid 312, and vice versa. For example, the at least one phase of electric power can be a single phase of electric power or multiple phases of electric power. The at least one battery 302 can include any type of cell capable of storing at least one phase of electric power, such as a lead-acid battery, a nickel cadmium battery, or a lithium-ion battery. The at least one battery 302 can be coupled to the at least one utility grid 312 via the at least one charging component 307 such that the at least one utility grid 312 is configured to transmit at least one phase of electric power to and from the at least one battery 302.

In one embodiment, the battery 302 can be coupled to the utility grid 312 via the charging component 307, which may include a DC/DC boost converter 308 and a DC/AC inverter 310. The battery 302 can be coupled to the DC/DC boost converter 308 via a DC boost inductor 316. The DC boost inductor 316 can facilitate the transmission of a phase of DC voltage 314 from the battery 302 to the DC/DC boost converter 308, and vice versa. The DC/DC boost converter 308 can be coupled to the DC/AC inverter 310 via a DC bus 318. The DC bus 318 can include a boost converter semiconductor switch (IGBT) and/or a diode. The DC bus 318 can be operated in a switched mode of operation to boost the input voltage from the battery 302 to a higher voltage. The DC/AC inverter 310 can be coupled to the utility grid 312 via an AC filter inductor 322. The AC filter inductor 322 can facilitate the transmission of a phase of AC voltage 320 from the DC/AC inverter 310 to the utility grid 312, and vice versa.

The system 300 can further include at least one battery monitor 304 and at least one controller 306. While the battery monitor 304 and the controller 306 are depicted in FIG. 3 as separate components, the battery monitor 304 and the controller 306 can be combined in a single component without departing from the spirit and scope of the disclosure. The battery monitor 304 can be coupled to the battery 302 and the controller 306 to facilitate the transmission of state information related to the battery 302. The battery monitor 304 may include a sensor, such as 305, in communication with the battery 302. The sensor 305 may be, for example, a voltage sensor, a current sensor, and/or a temperature sensor. The sensor 305 of the battery monitor 304 can measure and/or identify state information related to the battery 302. The controller 306 can be coupled to the battery monitor 304 and the charging component 307 to facilitate control of the charging operations of the battery 302. In one embodiment, the controller 306 can be coupled to the DC/DC boost converter 308 and the DC/AC inverter 310 to control each charging component's operations with respect to the battery 302. The controller 306 can include a processor and a memory, as will be further described in FIG. 5.

In one embodiment shown in FIG. 3, the battery monitor 304 can provide the controller 306 with state information related to the battery 302. The controller 306 can use the state information related to the battery 302 to measure and/or otherwise define a charge curve, such as 106 in FIG. 1, and/or a discharge curve, such as 206, 208, 210, and 212 in FIG. 2. The controller 306 can use the charge curve and/or the discharge curve to create a model of the battery 302. The model of the battery 302 can include data that describes the state and/or health of the battery 302. For example, the model of the battery 302 can include, but is not limited to, data describing the voltage, current, temperature, capacity, output power, cycle count, and degradation of the battery 302.

The controller 306 can determine whether the model of the battery 302 requires or otherwise needs adjustment based at least in part on state information related to the battery 302 provided by the battery monitor 304. The controller 306 can be configured to determine that the model of the battery 302 requires or otherwise needs adjustment if the state information related to the battery 302 is sufficiently different from the model of the battery 302. For example, an administrator of the controller 306 can define a predetermined level that the controller 306 can use as a basis for determining that the model of the battery 302 is sufficiently different from the state information related to the battery 302. Upon a determination that the model of the battery 302 needs adjustment, the controller 306 can adjust the model of the battery 302. The controller 306 can use the state information related to the battery 302 to adjust the model of the battery 302.

In another embodiment shown in FIG. 3, the controller 306 can determine whether to adjust an operation of the charging component 307 of the system 300, such as the DC/DC boost converter 308 and the DC/AC inverter 310. The controller 306 can use state information related to the battery 302 provided by the battery monitor 304 to determine whether to adjust the operation of the charging component 307. The controller 306 can be configured to determine that the charging component 307 requires or otherwise needs adjustment if the state information related to the battery 302 is sufficiently different from the model of the battery 302. For example, an administrator of the controller 306 can define a predetermined level that the controller 306 can use as a basis for determining that the model of the battery 302 is sufficiently different from the state information related to the battery 302. Upon a determination that the operation of the charging component 307 requires or otherwise needs adjustment, the controller 306 can adjust the operation of the charging component 307. The controller 306 can use the model of the battery 302 to adjust the operation of the charging component 307.

In yet another embodiment shown in FIG. 3, the controller 306 can determine whether a predetermined level has been reached. For example, an administrator of the controller 306 can define the predetermined level. The controller 306 can use state information related to the battery 302 provided by the battery monitor 304 to determine whether the predetermined level has been reached. Upon a determination that the predetermined level has been reached, the controller 306 can provide, generate, or otherwise facilitate a warning related to the predetermined level having been reached.

Figure 4:
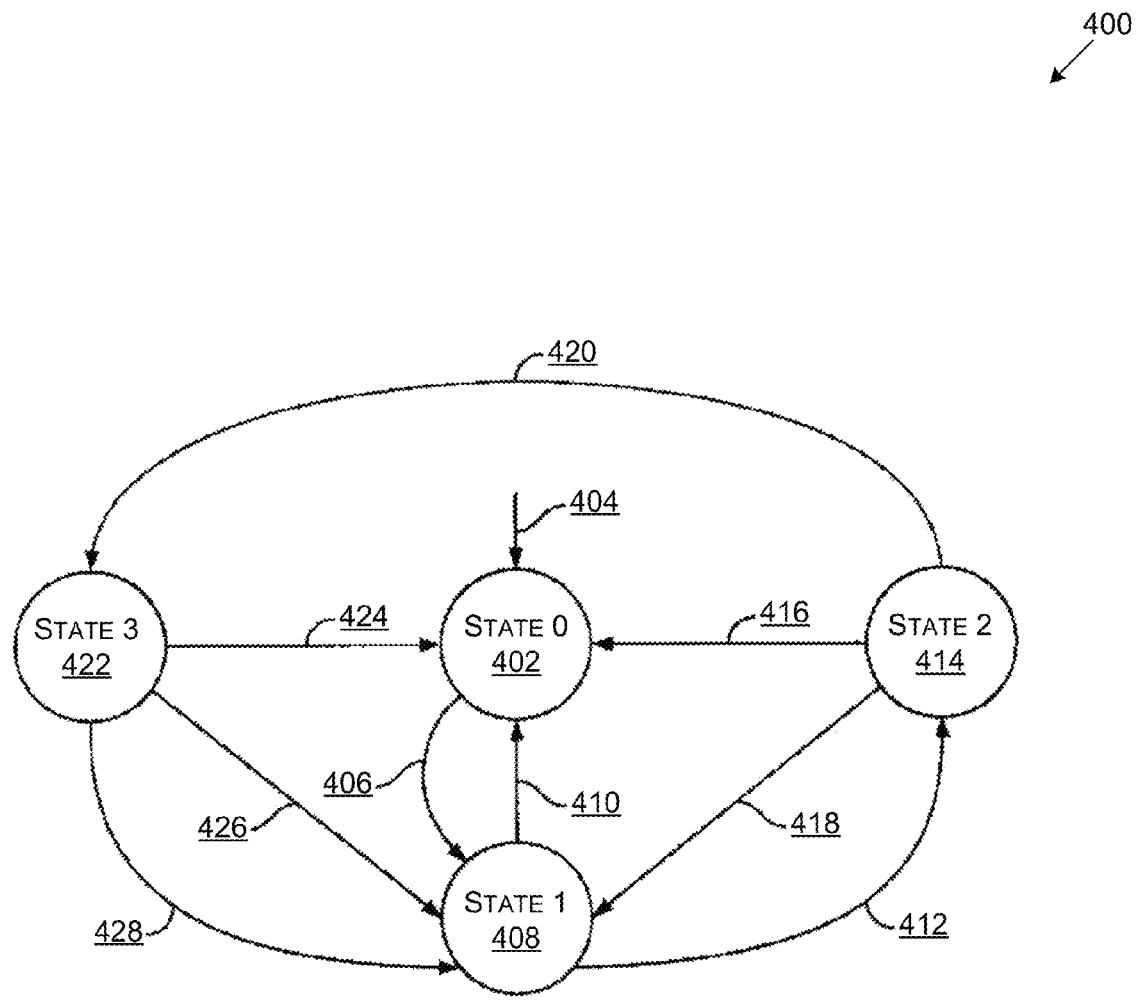
FIG. 4 illustrates an example process according to an embodiment of the disclosure.

FIG. 4 illustrates an example process according to an embodiment of the disclosure. In one embodiment, the process 400 can be implemented by a system such as a state machine, which can perform any, some, or all of the operations of the process 400. This process 400 is illustrated as a logical flow diagram, in which each operation represents a sequence of operations that can be implemented in hardware, software, or a combination thereof. In some embodiments, the state machine may include four states: "State 0" 402, "State 1" 408, "State 2" 414, and "State 3" 422. Paths between the states, such as 406, 410, 412, 416, 418, 420, 424, 426, and 428, can connect the states 402, 408, 414, and 422 to enable shifting from one state to another.

In certain embodiments, the state machine can be configured to receive a "power up" input signal 404 upon successful powering up of the control. Receipt of the input signal 404 can initiate the state machine, which can shift the state machine initially to "State 0" 402. "State 0" 402 can be characterized by the state machine preconditioning a set of values to be inserted into the registers of the state machine. After a pre-determined condition is satisfied, the state machine can attain a permissive to shift from "State 0" 402 to "State 1" 408 via the path 406. In one embodiment, the predetermined condition can be the passage of a certain amount of time, such as a few seconds.

The state machine can be configured to execute at least one operation upon transitioning to "State 1" 408. In one embodiment, the state machine can temporarily store battery information, such as charge information and/or discharge information, which can represent a model of a certain battery. In another embodiment, the state machine can compare the battery charge information and/or battery discharge information to previous battery models. In some embodiments, the state machine can employ an algorithm to determine whether the most recent battery information is sufficiently different from the battery models to permit a shift from "State 1" 408 to "State 2" 414. The data can be considered sufficiently different if, for example, the difference exceeds a predetermined level. If the difference in the data is considered to be sufficiently different, the state machine can shift from "State 1" 408 to "State 2" 414 via the path 412. On the contrary, if the difference in the data is not considered to be sufficiently different, the state machine can remain in "State 1" 408.

Additionally, the state machine can be configured to execute at least one operation upon transitioning to "State 2" 414. In one embodiment, the state machine can permanently store the battery information, such as battery charge information and/or battery discharge information, in the battery models. The battery models can, for example, be stored in a lookup table accessible to the state machine. The state machine can utilize the battery model in combination with a mathematical algorithm to predict battery charge performance and/or battery discharge performance. In some embodiments, the state machine can employ an algorithm to determine whether the most recent battery information is sufficiently different from the battery model to permit a shift from "State 2" 414 to "State 3" 422. The data can be considered sufficiently different if, for example, the difference exceeds a predetermined level. If the difference in the data is considered to be sufficiently different, the state machine can shift from "State 2" 414 to "State 3" 422 via the path 420. On the contrary, if the difference in the data is not considered to be sufficiently different, the state machine can shift from "State 2" 414 to "State 1" 408 via the path 418.

Furthermore, the state machine can be configured to execute at least one operation upon transitioning to "State 3" 422. In one embodiment, the state machine can update the battery models based at least in part on the most recent battery information. In another embodiment, the state can update the algorithms that define the battery models in order to improve the accuracy of the battery models to within a certain desired accuracy level. In some embodiments, the process 400 can be iterative by increasing the accuracy level of the battery models until the desired accuracy level of the battery models is achieved. In any instance, the state machine can shift from "State 3" 422 to "State 1" 402 via the transition path 426 once the desired accuracy level is achieved.

Other transition paths not described herein for state transitions are shown in FIG. 4. While the disclosure has been described in terms of various specific embodiments, those skilled in the art will recognize that the invention can be practiced with modification within the spirit and scope of the claims. More specifically, any state transitions shown in FIG. 4 that facilitate the operation of the systems and methods as described herein may be used.

Figure 5:
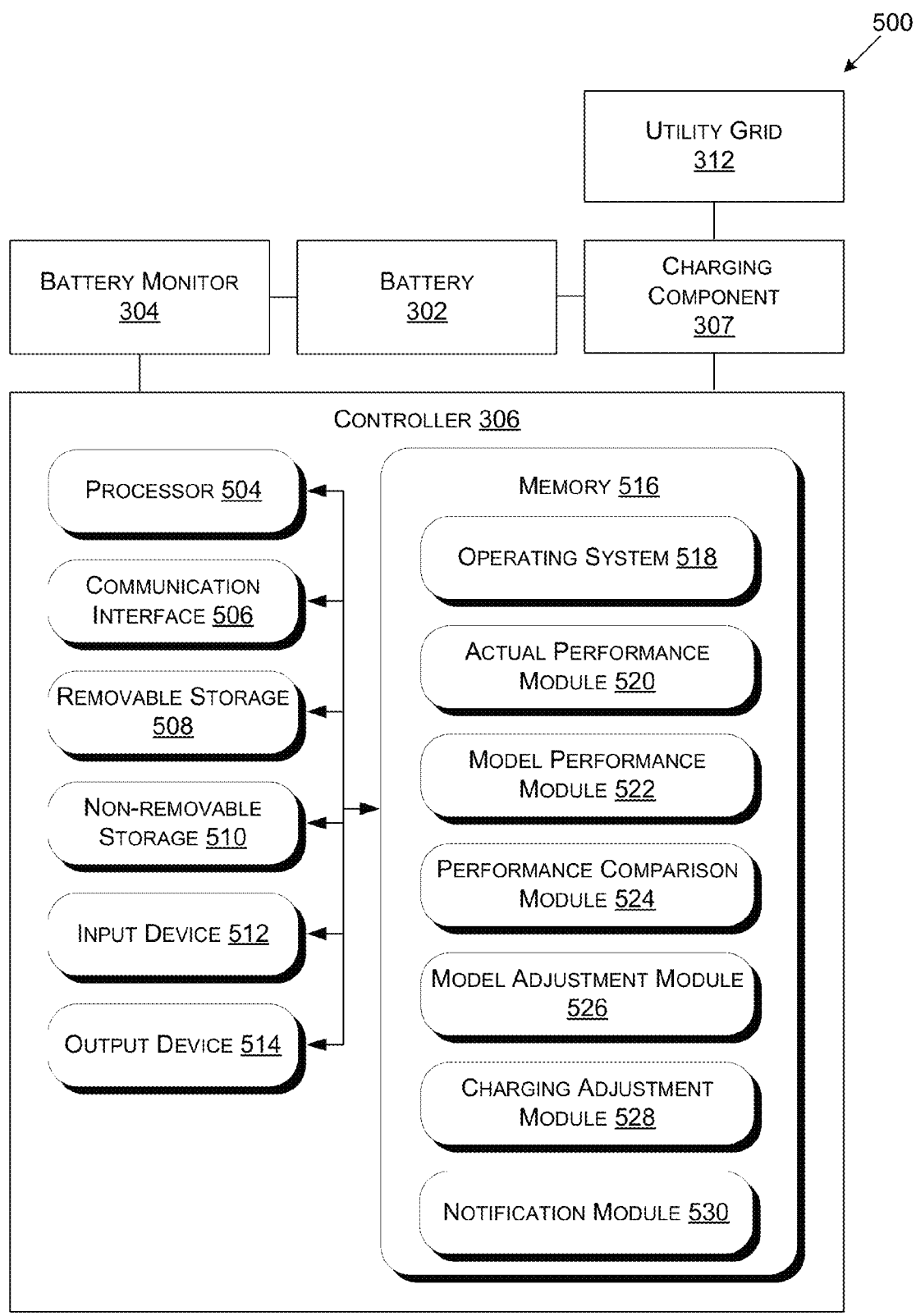
FIG. 5 illustrates yet another example system according to an embodiment of the disclosure.

FIG. 5 illustrates an example environment or system 500 for controlling battery charging. The example environment or system 500 can be configured to be a networked environment or system, or distributed computer environment or system. The example environment or system 500 can include at least one battery 302, at least one battery monitor 304, at least one controller 306, at least one charging component 307, and at least one utility grid 312, as described herein with respect to FIG. 3.

In the embodiment shown in FIG. 5, the at least one controller 306 can include at least one processor 504 and at least one memory 516. As shown in FIG. 5, the processor 504 can be in communication with the memory 516. The processor 504 can be implemented as appropriate in hardware, software, firmware, or combinations thereof. Software or firmware implementations of the processor 504 can include computer-executable or machine-executable instructions written in any suitable programming language to perform the various functions described. The controller 306 may be a computing device, such as a personal computer (PC), a handheld or tablet computer, or other processor-based device.

The memory 516 can store program instructions that are loadable and executable on the processor 504, as well as data generated during the execution of these programs. Depending on the configuration and type of environment or system 500, the memory 516 can be volatile, such as random access memory (RAM), and/or non-volatile, such as read-only memory (ROM) or flash memory. The controller 306 can further include removable storage 508 and/or non-removable storage 510 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 516 can include multiple different types of memory, such as static random access memory (SRAM), dynamic random access memory (DRAM), or ROM.

The memory 516, removable storage 508, and non-removable storage 510 are all examples of computer-readable storage media. For example, computer-readable storage media can include volatile and non-volatile, removable and non-removable media implemented in any method or technology for storage of information such as computer-readable instructions, data structures, program modules or other data. The memory 516, removable storage 508, and non-removable storage 510 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the server or other computing device. Combinations of any of the above should also be included within the scope of computer-readable media. In other embodiments, computer-readable communication media may include computer-readable instructions, program modules, or other data transmitted within a data signal, such as a carrier wave, or other transmission. However, as used herein, computer-readable storage media does not include computer-readable communication media.

The example environment or system 500 may further include at least one communication interface 506. The communication interface 506 can allow the controller 306 to communicate with other components of the environment or system 500 and/or other environments or systems. For example, the communication interface 506 can be configured to establish a communicative connection with the battery monitor 304 and/or the charging component 307. Additionally, the environment or system 500 may also include an input device 512 and an output device 514. The input device 512 can include, for example, a keyboard, a mouse, a pen, a voice input device, or a touch input device. The output device 514 can include, for example, a display, speakers, or a printer.

Turning to the contents of the at least one memory 516 in more detail, the at least one memory 516 can include at least one operating system 518 and at least one application program or service for implementing the features and aspects disclosed herein. In one embodiment, the application program or service of the memory 516 can include an actual performance module 520, a model performance module 522, a performance comparison module 524, and a model adjustment module 526. The actual performance module 520 can be configured to receive state information related to the battery 302 from the battery monitor 304 via the communication interface 506. The actual performance module 520 can be further configured to measure a charge curve and/or a discharge curve associated with the battery 302 based at least in part on the state information related to the battery 302. The model performance module 522 can be configured to receive the charge curve and/or the discharge curve associated with the battery 302 from the actual performance module 520. The model performance module 522 can be further configured to create a model of the battery 302 based at least in part on the charge curve and/or the discharge curve associated with the battery 302.

The performance comparison module 524 can be configured to receive state information related to the battery 302 from the actual performance module 520 and at least one model of the battery 302 from the model performance module 522. The performance comparison module 524 can be further configured to determine whether the model of the battery 302 needs adjustment. The performance comparison module 524 can determine that the model of the battery 302 needs adjustment if the state information related to the battery 302 is sufficiently different from the model of the battery 302. The model adjustment module 526 can be configured to receive at least one indication that the model of the battery 302 needs adjustment from the performance comparison module 524. The model adjustment module 526 can be further configured to adjust the model of the battery 302. The model adjustment module 526 can adjust the model of the battery 302 based at least in part on the state information related to the battery 302, which can be received from the battery monitor 304 via the communication interface 506.

In another embodiment, the application program or service of the memory 516 can further include a charging adjustment module 528. The charging adjustment module 528 can be configured to receive state information related to the battery 302 from the battery monitor 304 via the communication interface 506. The charging adjustment module 528 can be further configured to determine whether an operation of the charging component 307 needs adjustment. The charging adjustment module 528 can determine that the operation of the charging component 307 needs adjustment based at least in part on the state information related to the battery 302. The charging adjustment module 528 can be yet further configured to adjust the operation of the charging component 307 in response to a determination that the operation of the charging component 307 needs adjustment. The charging adjustment module 528 can adjust the operation of the charging component 307 based at least in part on the model of the battery 302, which can be received from the model performance module 522.

In yet another embodiment, the application program or service of the memory 516 can further include a notification module 530. The notification module 530 can be configured to receive state information related to the battery 302 from the battery monitor 304 via the communication interface 506. The notification module 530 can be further configured to determine whether a predetermined level has been reached. The notification module 530 can determine that the predetermined level has been reached if the state information related to the battery 302 is equal to and/or exceeds the predetermined level. The notification module 530 can be yet further configured to provide a warning related to the predetermined level having been reached in response to a determination that the predetermined level has been reached.

The example systems and methods for controlling battery charging shown in FIGS. 1-5 are provided by way of example only. Numerous other apparatus, systems, operating environments, system architectures, and device configurations are possible. Accordingly, embodiments of the disclosure should not be construed as being limited to any particular apparatus, system, operating environment, system architecture, or device configuration. While the embodiments of the disclosure shown in FIGS. 1-5 are tailored for relatively large scale battery energy storage systems, one will recognize the applicability of other embodiments of the disclosure to other types of battery energy storage systems, such as relatively small scale battery energy storage systems.

Figure 6:
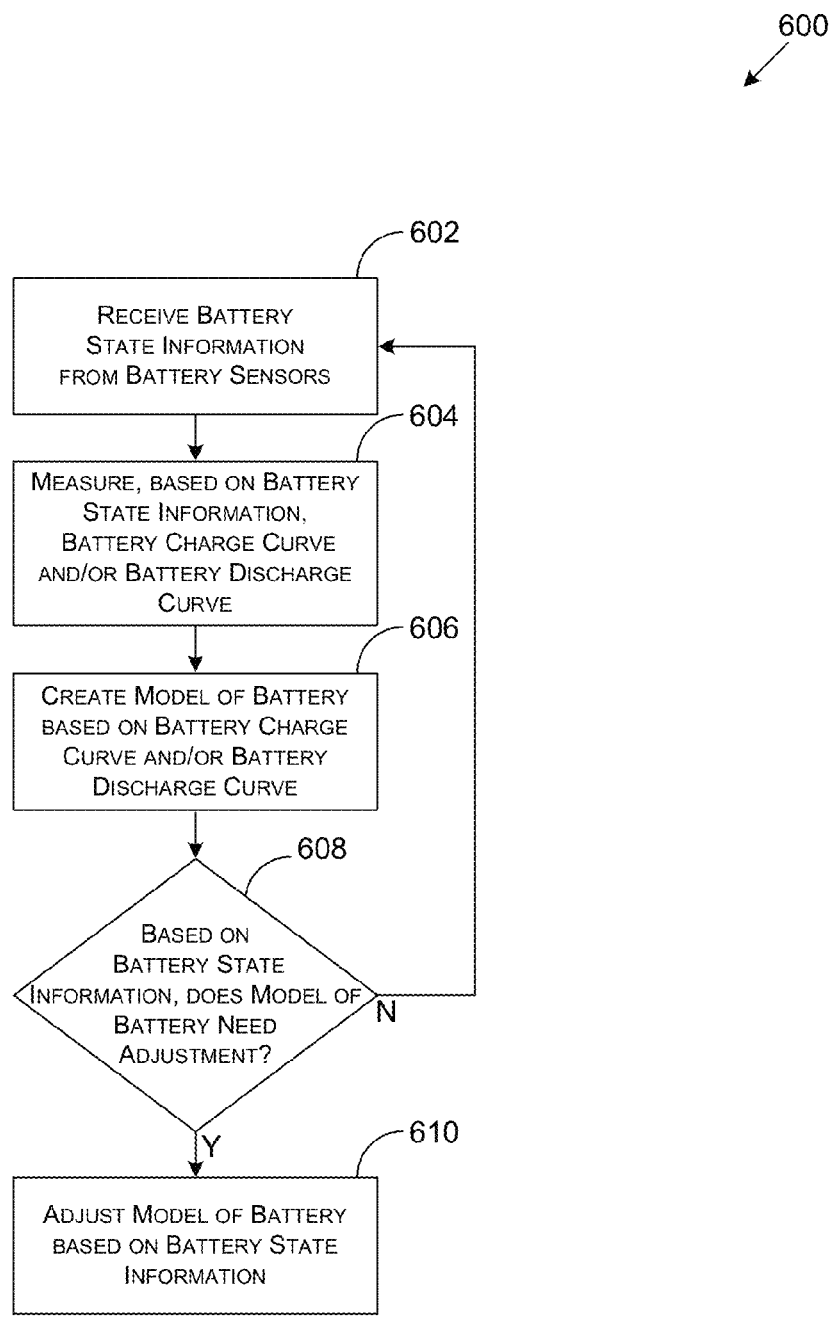
FIG. 6 illustrates a flow diagram of another example method according to an embodiment of the disclosure.

In the particular implementation shown in FIG. 6, the example process 600 may begin at block 602 in which the process 600 can receive state information related to a battery. The state information related to the battery can be received from a sensor in communication with the battery. For example, in the embodiment shown in FIG. 5, a battery monitor, such as 304, a battery controller, such as 306, and/or a processor, such as 504, can receive or otherwise measure the state of a battery, such as 302. The battery monitor 304 and/or the battery controller 306 can be and/or include a sensor in communication with the battery 302.

In one embodiment, the state information related to the battery 302 can include at least one of information related to the charging of the battery 302 or information related to the discharging of the battery 302.

At block 604, the process 600 can measure at least one of a charge curve associated with the battery 302 or a discharge curve associated with the battery 302. The charge curve associated with the battery 302 can be measured based at least in part on the state information related to the battery 302. Similarly, the discharge curve associated with the battery 302 can be measured based at least in part on the state information related to the battery 302. For example, a processor, such as 504 in FIG. 5, and/or an actual performance module, such as 520 in FIG. 5, can receive or otherwise measure, based at least in part on the state information related to the battery 302, at least one of the charge curve associated with the battery 302 or the discharge curve associated with the battery 302.

In one embodiment, the process 600 can store information related to at least one of the charge curve associated with the battery 302 or the discharge curve associated with the battery 302. For example, a processor, such as 504 in FIG. 5, can store or otherwise retain the information related to at least one of the charge curve associated with the battery 302 or the discharge curve associated with the battery 302 in a memory, such as 516 in FIG. 5.

At block 606, the process 600 can create a model of the battery 302. The model of the battery 302 can be based at least in part on the charge curve associated with the battery 302. Additionally, the model of the battery 302 can be based at least in part on the discharge curve associated with the battery 302. For example, a processor, such as 504 in FIG. 5, and/or a model performance module, such as 522 in FIG. 5, can create or otherwise establish, based at least in part on at least one of the charge curve associated with the battery 302 or at least one discharge curve associated with the battery 302, the model of the battery 302.

At block 608, the process 600 can determine whether to adjust the model of the battery 302. The determination of whether to adjust the model of the battery 302 can be based at least in part on the state information related to the battery 302. For example, a processor, such as 504 in FIG. 5, and/or a performance comparison module, such as 524 in FIG. 5, can determine, based at least in part on the state information related to the battery 302, whether to adjust the model of the battery 302. Responsive to a determination that the model of the battery 302 is not to be adjusted, the process 600 can return to block 602 to receive additional state information related to the battery 302. On the contrary, responsive to a determination that the model of the battery 302 is to be adjusted, the process 600 can transition to block 610.

At block 610, the process 600 can adjust the model of the battery 302 in response to a determination that the model of the battery 302 is to be adjusted. The model of the battery 302 can be adjusted based at least in part on the state information related to the battery 302. For example, a processor, such as 504 in FIG. 5, and/or a model adjustment module, such as 526 in FIG. 5, can adjust the model of the battery 302 based at least in part on state information related to the battery 302 in response to a determination that the model of the battery 302 is to be adjusted.

In one embodiment, the process 600 can determine whether to adjust an operation of a charger in communication with the battery 302. The charger can include one or more charging components, as described herein. The determination of whether to adjust the operation of the charger in communication with the battery 302 can be made based at least in part on the state information related to the battery 302. Responsive to a determination that the operation of the charger in communication with the battery 302 is to be adjusted, the process 600 can adjust the operation of the charger in communication with the battery 302. The adjustment to the operation of the charger in communication with the battery 302 can be made based at least in part on the model of the battery 302.

For example, a processor, such as 504 in FIG. 5, and/or a charging adjustment module, such as 528 in FIG. 5, can determine, based at least in part on the model of the battery 302, whether to adjust the operation of the charging component in communication with the battery 302, such as 307 in FIG. 5. Additionally, the processor 504 and/or the charging adjustment module 528 can adjust, based at least in part on the model of the battery 302, the operation of the charging component 307 in communication with the battery 302 in response to a determination that the operation of the charging component 307 in communication with the battery 302 is to be adjusted. In certain embodiments, the charging component 307 in communication with the battery 302 can include at least one of a bidirectional DC/DC converter or a DC/AC inverter.

In another embodiment, the process 600 can determine whether a predetermined level has been reached. The determination of whether the predetermined level has been reached can be made based at least in part on the state information related to the battery 302. Responsive to a determination that the predetermined level has been reached, the process 600 can provide a warning related to the predetermined level having been reached. For example, a processor, such as 504 in FIG. 5, and/or a notification module, such as 530 in FIG. 5, can determine, based at least in part on the state information related to the battery 302, whether the predetermined level has been reached. Additionally, the processor 504 and/or the notification module 530 can provide a warning related to the predetermined level having been reached in response to a determination that the predetermined level has been reached.

The process 600 may end after block 610. In other process embodiments, fewer or greater numbers of operations can be implemented.

Illustrative systems and methods for controlling battery charging are described above. Some or all of these systems and methods may, but need not, be implemented at least partially by an architecture such as those shown in FIGS. 1-6. It should be understood that certain acts in the methods need not be performed in the order described, may be rearranged or modified, and/or may be omitted entirely, depending on the circumstances. Also, any of the acts described above with respect to any method may be implemented by any number of processors or other computing devices based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system, comprising:
a memory for storing computer-executable instructions that, when executed by a processor, configure the processor to perform operations comprising:
receiving, from a sensor in communication with a battery, state information related to the battery;
defining, based at least in part on the state information related to the battery, at least one of a charge curve associated with the battery or a discharge curve associated with the battery;
using the at least one of the charge curve associated with the battery or the discharge curve associated with the battery to create a model of the battery, the model of the battery comprising data describing the battery; and
based at least in part on determining that the state information related to the battery is different than the model of the battery, adjusting at least one of the model of the battery or an operation of a charger in communication with the battery.

2. The system of claim 1, wherein the state information related to the battery comprises at least one of information related to the charging of the battery or information related to the discharging of the battery.

3. The system of claim 1, wherein the computer-executable instructions configure the processor to perform operations further comprising:
storing information related to the at least one of the charge curve associated with the battery or the discharge curve associated with the battery.

4. The system of claim 1, wherein the charger in communication with the battery comprises at least one of a bidirectional DC/DC converter or a DC/AC inverter.

5. The system of claim 1, wherein the computer-executable instructions configure the processor to perform operations further comprising:
determining, based at least in part on the state information related to the battery, whether a predetermined level has been reached; and,
responsive to a determination that the predetermined level has been reached, providing a warning related to the predetermined level having been reached.

6. A method, comprising:
receiving, from a sensor in communication with a battery, state information related to the battery;
defining, based at least in part on the state information related to the battery, at least one of a charge curve associated with the battery or a discharge curve associated with the battery;
creating a model of the battery based at least in part on at least one of the charge curve associated with the battery or the discharge curve associated with the battery;
determining, based at least in part on the model of the battery, whether to adjust an operation of a charger in communication with the battery; and,
responsive to a determination that the operation of the charger in communication with the battery is to be adjusted, adjusting the operation of the charger.

7. The method of claim 6, wherein the state information related to the battery comprises at least one of information related to charging of the battery or information related to discharging of the battery.

8. The method of claim 6, further comprising:
storing information related to the at least one of the charge curve associated with the battery or the discharge curve associated with the battery.

9. The method of claim 6, wherein the charger in communication with the battery comprises at least one of a bidirectional DC/DC converter or a DC/AC inverter.

10. The method of claim 6, further comprising:
determining, based at least in part on the state information related to the battery, whether a predetermined level has been reached; and,
responsive to a determination that the predetermined level has been reached, providing a warning related to the predetermined level having been reached.

11. A system, comprising:
a battery;
a charger in communication with the battery;
a sensor in communication with the battery; and
a memory for storing computer-executable instructions that, when executed by a processor, configure the processor to perform operations comprising:
receiving, from the sensor in communication with the battery, state information related to the battery;
determining, based at least in part on the state information related to the battery, whether to adjust a model of the battery; and,
responsive to a determination that the model of the battery is to be adjusted, adjusting at least one of the model of the battery or an operation of the charger in communication with the battery.

12. The system of claim 11, wherein the state information related to the battery comprises at least one of information related to the charging of the battery or information related to the discharging of the battery.

13. The system of claim 11, wherein the computer-executable instructions configure the processor to perform operations further comprising:

measuring, based at least in part on the state information related to the battery, at least one of a charge curve associated with the battery or a discharge curve associated with the battery.

14. The system of claim 13, wherein the computer-executable instructions configure the processor to perform operations further comprising:

storing information related to the at least one of the charge curve associated with the battery or the discharge curve associated with the battery.

15. The system of claim 13, wherein the computer-executable instructions configure the processor to perform operations further comprising:

creating the model of the battery based at least in part on the at least one of the charge curve associated with the battery or the discharge curve associated with the battery.

16. The system of claim 11, wherein the charger in communication with the battery comprises at least one of a bidirectional DC/DC converter or a DC/AC inverter.

17. The system of claim 11, wherein the computer-executable instructions configure the processor to perform operations further comprising:

determining, based at least in part on the state information related to the battery, whether a predetermined level has been reached; and, responsive to a determination that the predetermined level has been reached, providing a warning related to the predetermined level having been reached.

18. The method of claim 6, further comprising:

determining, based at least in part on the state information related to the battery, whether to adjust the model of the battery; and, responsive to a determination that the model of the battery is to be adjusted, adjusting the model of the battery based at least in part on the state information related to the battery.

* * * * *